(12) United States Patent
Stephenson et al.

(10) Patent No.: US 7,840,363 B2
(45) Date of Patent: Nov. 23, 2010

(54) DETERMINING TOTAL MILL FLOW IN A BIOFUEL PRODUCTION PROCESS

(75) Inventors: Brian K. Stephenson, Georgetown, TX (US); Patrick D. Noll, Richardson, TX (US); Maina A. Macharia, Round Rock, TX (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 124 days.

(21) Appl. No.: 12/052,159

(22) Filed: Mar. 20, 2008

(65) Prior Publication Data

US 2009/0235716 A1 Sep. 24, 2009

(51) Int. Cl.
*G01F 1/00* (2006.01)
(52) U.S. Cl. ............... 702/45; 702/19; 702/22; 702/23; 702/137; 702/182
(58) Field of Classification Search ............... 702/19.23, 702/45; 435/158–161
See application file for complete search history.

(56) References Cited

U.S. PATENT DOCUMENTS

| | | | |
|---|---|---|---|
| 3,379,421 A | | 4/1968 | Putman |
| 4,390,957 A | * | 6/1983 | Skarlos et al. ............... 702/25 |
| 6,496,781 B1 | | 12/2002 | Chen et al. |
| 2004/0033457 A1 | | 2/2004 | Zhang et al. |
| 2007/0078530 A1 | * | 4/2007 | Blevins et al. ............... 700/29 |
| 2008/0028675 A1 | * | 2/2008 | Clifford et al. ............... 44/605 |
| 2008/0103747 A1 | | 5/2008 | Macharia et al. |
| 2008/0103748 A1 | | 5/2008 | Axelrud et al. |
| 2008/0104003 A1 | | 5/2008 | Macharia et al. |
| 2008/0108048 A1 | | 5/2008 | Bartee et al. |
| 2008/0109100 A1 | | 5/2008 | Macharia et al. |
| 2008/0109200 A1 | | 5/2008 | Bartee et al. |
| 2008/0167852 A1 | | 7/2008 | Bartee et al. |
| 2009/0261037 A1 | * | 10/2009 | Clifford et al. ............... 210/614 |
| 2010/0055741 A1 | * | 3/2010 | Galvez et al. ............... 435/74 |

FOREIGN PATENT DOCUMENTS

EP 0303345 A2 2/1989

OTHER PUBLICATIONS

Webster's II New Riverside University Dictionary, 1984, Houghton Mifflin Company, ISBN 0-395-33957-X, p. 249.*

(Continued)

*Primary Examiner*—Hal D Wachsman
*Assistant Examiner*—Mi'schita' Henson
(74) *Attorney, Agent, or Firm*—Fletcher Yoder LLP; William R. Walburn; John M. Miller

(57) ABSTRACT

System and method for determining total mill flow (TMF) in a biofuel production process. Measured slurry flow and density values from a process fed by mill(s), backset, and at least one water source, are received. The slurry includes biomass solids and water. Measured backset flow and density values, and a backset composition value are received, as well as a slurry composition value indicating % biomass solids of the slurry is received. A quantity of biomass solids and/or water of the slurry determined based on the slurry flow, density, and composition, and a quantity of the biomass solids and/or water of the backset determined based on the backset flow and density, backset composition, and a system filter characterizing time delays and lags between measurements of the backset flow and biomass slurry flow. Total mill flow is determined based on the quantities of biomass solids and/or water of the slurry and backset.

25 Claims, 6 Drawing Sheets

OTHER PUBLICATIONS

U.S. Appl. No. 12/165,371, filed Jun. 30, 2008, Macharia et al.
U.S. Appl. No. 12/242,531, filed Sep. 30, 2008, Macharia et al.
U.S. Appl. No. 12/242,568, filed Sep. 30, 2008, Macharia et al.
U.S. Appl. No. 12/242,606, filed Sep. 30, 2008, Macharia et al.
U.S. Appl. No. 12/242,635, filed Sep. 30, 2008, Macharia et al.

* cited by examiner

DETERMINING TOTAL MILL FLOW IN A BIOFUEL PRODUCTION PROCESS

FIELD OF THE INVENTION

The present invention generally relates to the field of biofuel production. More particularly, the present invention relates to systems and methods for determining total mill flow in a biofuel production process.

DESCRIPTION OF THE RELATED ART

Biofuel Production Plant

An exemplary high-level design of a biofuel production plant or process is shown in FIG. 1, which illustrates how biomass is processed through several stages to produce biofuel and one or more co-products. As may be seen, first, biomass is provided to a milling and cooking process, where biomass is broken down to increase the surface area to volume ratio. This increase in surface area allows for sufficient interaction of the fresh water (FW) and biomass surface area to achieve a solution of fermentable sugars in water. More specifically, raw feedstock biomass, e.g., grain, etc., is conveyed (e.g., by a conveyor) to one or more mills that grind the feedstock and provide the milled biomass to a slurry tank. Cooking water, which may be a combination of fresh water, recycled water from other processes in the plant, and backset, which may include a small percentage of biomass, is also added to the slurry tank. The mixture, a biomass/water slurry, may then be cooked to promote an increase in the amount of biomass-water contact in solution and to increase the separation of carbohydrate biomass from the non-carbohydrate biomass. After cooking, the biomass slurry is provided to a cook and/or hydro-heating unit, e.g., a flash cook unit, which may operate to vaporize and remove moisture from the slurry. The processed slurry is then stored in a liquefaction tank, which operates to further liquefy the slurry, and from which the fermentation feed is provided to batch fermenters, as shown. As FIG. 1 indicates, the milling/cooking process is generally a continuous process, where biomass is continually processed through the various milling and cooking sub-processes.

Thus, the output of the milling and cooking units (i.e., the fermentation feed or slurry), including liquefaction, is then sent to a fermentation process, where one or more fermentation units (vats) operate to ferment the biomass/water slurry produced by the milling and cooking process. The fermentation process may or may not require addition of additional fresh water to the process to control the consistency of material to the batch fermentation units (also referred to herein as fermenters). In the fermentation units, biomass is converted by yeast and enzymes into a biofuel, and by-products such as carbon-dioxide, water and non-fermentable bio-mass (solids). As fermentation proceeds, more sugar in the fermentation mash or slurry is converted into biofuel.

The output from the fermentation process is sent to a distillation process, e.g., one or more distillation units, to separate biofuel from water, carbon dioxide, and non-fermentable solids. If the biofuel has to be dehydrated to moisture levels less than 5% by volume, the bio-fuel can be processed through a processing unit called a molecular sieve. The finalized biofuel is then processed to ensure it is denatured and not used for human-consumption. The distillation units separate the biofuel from water. Stillage (non-fermentable solids and yeast residue), the heaviest output of the distillation units, is sent to stillage processing for further development of co-products from the biofuel production process. Stillage processing units separate additional water from the cake solids and may recycle this water back to the milling and cooking units.

Referring back to the milling process, in prior art systems, the flow of feedstock into the mills and into the slurry tank (after mixing with cook water) is provided and regulated by rotary pocket feeders, and is generally estimated by the specified capacity and rotation rates of the feeders. However, this estimation is rather inaccurate due to various uncontrolled influences, such as feedstock moisture content, flowability (viscosity), etc. Thus, performance or efficiency of the biofuel process may not be accurately determined, since accurate measures of input to the process are not available.

Thus, improved systems and methods for determining total mill flow in a biofuel production process are desired.

SUMMARY OF THE INVENTION

Various embodiments of a system and method for determining a total mill flow in a biofuel production process are presented.

Measured biomass slurry flow and slurry density values from a process fed by one or more mills, backset, and at least one water source, may be received. The process preferably includes one or more slurry mixing or holding tanks, and the slurry includes biomass solids and water. For example, the process may include or be included in the milling/cooking process of a biofuel plant. A slurry composition value indicating % biomass solids of the slurry may also be received. Note that the slurry composition value may indicate % biomass solids of the slurry directly, e.g., 30% solids, or indirectly, e.g., 70% water, since the solids and water values are complementary.

A measured backset flow value, a backset density value, and a backset composition value indicating % biomass solids of the backset, may be received. In preferred embodiments, the measured biomass slurry flow and slurry density values, and the measured backset flow value are received from sensors coupled to the biofuel process. For example, the biofuel production process, specifically, the milling/cooking process, may be instrumented with various sensors to measure these parameters or values. As with the slurry composition value, the backset composition value may indicate % biomass solids of the backset directly, e.g., 30% solids, or indirectly, e.g., 70% water, since the solids and water values are complementary.

The biofuel production plant may include or be included in a system configured to implement embodiments of the present invention, as will be discussed in more detail below. For example, the system may include a plurality of sensors coupled to the biofuel process for providing the measured values discussed above, e.g., a slurry flow sensor configured to measure biomass slurry flow, a slurry density sensor configured to measure slurry density from the process, and a backset flow sensor configured to measure backset flow. Moreover, the system may also include one or more computers coupled to the process, and operable to perform embodiments of the methods disclosed herein.

A quantity of biomass solids and/or water of the slurry may be determined based on the measured biomass slurry flow and slurry density values and the slurry composition value. A quantity of the biomass solids and/or water of the backset may be determined based on the measured backset flow value, the backset density value, the backset composition value, and a system filter that characterizes time delays and time lags of the between measurement of the backset flow and measurement of the biomass slurry flow. Total mill flow may then be determined based on the quantity of biomass solids and/or water of the slurry and the quantity of the biomass solids and/or water of the backset.

Note that since the milling/cooking process occurs over time, changes in input, e.g., from the backset, take some time to effect changes in the downstream slurry, which results in time delays and/or time lags, generally denoted by τ. Thus, a measurement made upstream at a particular time will not generally correspond to a measurement made downstream at the same time, and so in preferred embodiments, the system filter mentioned may be used to adjust or account for the fact that the process occurs over time, and that changes in input, e.g., from the backset, take some time to effect changes in the downstream slurry. In other words, a filter may be needed to ensure that the input values, e.g., backset values are consonant with or appropriate with respect to, the downstream values, e.g., slurry values. The filter may be applied to input values, e.g., backset values, or others, to modify the values such that they correspond to measured values downstream, e.g., slurry values.

In some embodiments, the material balances used to determine total mill flow may be based on water instead of solids, which may entail different parameters or terms, most notably, % W(ater), instead of % S(olids), among others. The mill solids may also be referred to as total mill flow $F_M$, which refers to the amount of biomass processed by the mills (and eventually converted to biofuel) over a specified time period, e.g., per day.

Note that four primary embodiments of the invention are directed to 1) slurry just after exiting the slurry tank, using material balance of biomass solids, 2) slurry just after exiting the slurry tank, using material balance of biomass water, 3) slurry just after liquefaction, using material balance of biomass solids, 4) slurry just after liquefaction, using material balance of biomass water. Of course, other embodiments are also contemplated, the above being exemplary only, and not intended to limit the application of material balance in determining total mill flow in a biofuel production process to any particular measurements or computations.

The determined total mill flow may be stored, e.g., in a memory medium of a computer. The total mill flow may then be useable to determine production efficiency in the biofuel production process. For example, in one embodiment, the determined total mill flow may be provided to a model predictive controller as input, and the model predictive controller may control milling rates based on the determined total mill flow. Additionally, or alternatively, the determined total mill flow may be indicated to an operator of the biofuel production process, and may be useable by the operator to control biofuel production in the biofuel production process. As is well known in the art of process control, this control may be performed in an iterative manner.

Thus, various embodiments of the systems and methods described herein may be used to determine total mill flow in a biofuel production process.

BRIEF DESCRIPTION OF THE DRAWINGS

A better understanding of the present invention can be obtained when the following detailed description of the preferred embodiment is considered in conjunction with the following drawings, in which.

Figure 1:
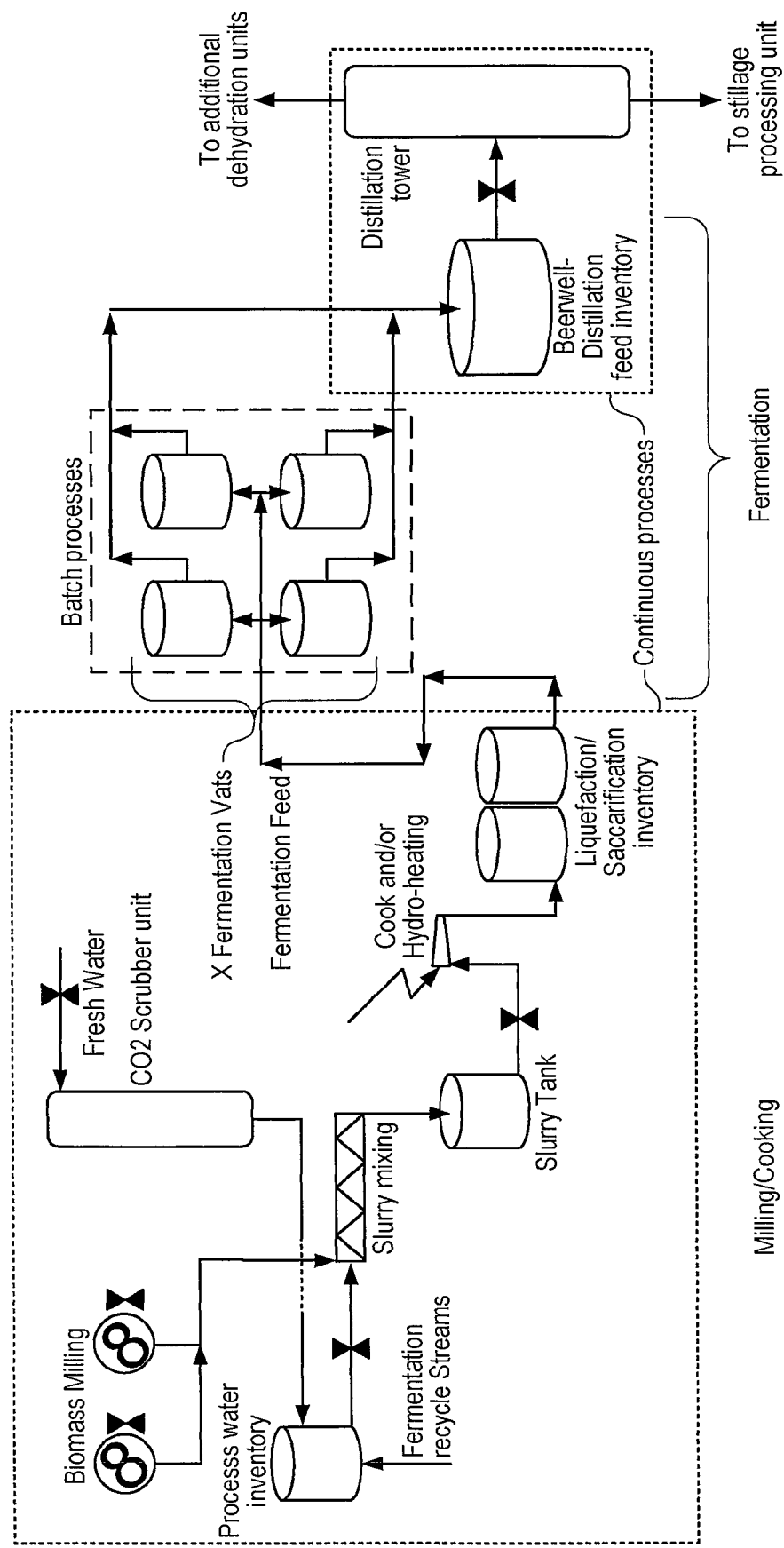
FIG. 1 illustrates batch and continuous processes in an exemplary biofuel processing plant, according to the prior art.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims.

DETAILED DESCRIPTION OF THE INVENTION

Incorporation by Reference

The following references are hereby incorporated by reference in their entirety as though fully and completely set forth herein:

U.S. patent application Ser. No. 11/757,557, titled "Model Predictive Control of a Fermentation Feed in Biofuel Production", filed Jun. 4, 2007.

U.S. patent application Ser. No. 11/862,391, titled "Model Predictive Control of Distillation and Dehydration Sub-Processes in a Biofuel Production Process", filed Sep. 27, 2007.

U.S. patent application Ser. No. 11/924,370, titled "Model Predictive Control of Integrated Stillage Processing in a Biofuel Production Process", filed Oct. 25, 2007.

U.S. patent application Ser. No. 11/928,186, titled "Integrated Model Predictive Control of Batch and Continuous Processes in a Biofuel Production Process", filed Oct. 30, 2007.

U.S. patent application Ser. No. 11/927,889, titled "Model Predictive Control of Fermentation in Biofuel Production", filed Oct. 30, 2007.

U.S. patent application Ser. No. 11/927,960, titled "Nonlinear Model Predictive Control of a Biofuel Fermentation Process", filed Oct. 30, 2007.

U.S. patent application Ser. No. 11/928,344, titled "Model Predictive Control of Fermentation Temperature in Biofuel Production", filed Oct. 30, 2007.

Definitions—Biofuel Production Processes

Biofuel—any fuel (or fuels) derived from biomass, i.e., from recently living organisms or their bi-products.

Biofuel production process—a fermentation process surrounded by auxiliary processing units to produce biofuel, other fermentable alcohols for fuel, and high-capacity food grade or chemical grade alcohols.

Biofuel production—a measure of biofuel production within or at the end of a batch process. May include measurements such as concentration (e.g., wt %, volume % or wt/vol %), volume (e.g., current gallons biofuel within a fermenter) or mass (e.g., current kg biofuel within a fermenter).

Batch processing—a staged discontinuous processing step that includes a start and an end, in contrast to continuous processing that continues without stop, e.g., during a normal operating day or week. Continuous processing is generally represented by fairly steady targets or operations, where at least some parameters change throughout batch processing.

For example, biofuel production, e.g., fermentation, starts at low levels at the start of a batch and increases throughout the batch with or without a drop at the end representing degradation rates being higher than production rates. Similarly, yeast cellular concentrations, start at fairly low levels, and generally grow throughout a batch, although they generally have a lag (relatively constant concentrations), exponential growth, stable growth and degradation phase within a batch.

Slurry—a fermentation feed mash comprising a two-phase (liquid and solid) slurry that will be fermented.

Solids or % solids—fraction or percent of solids in the fermentation feed.

Milling and Cooking Process—continuous processing for pre-fermentation of the fermentation feed, which generally includes grain or cane milling, cooking, mixing with water and processing chemicals, cooking for sterilization and increasing water concentration within solids, and other pre-fermentation processing.

Biomass concentration—content attribute of the fermentation feed specified by one or more of: slurry solids, liquefaction solids, slurry density, liquefaction density, slurry % or fraction carbohydrates, and slurry % or fraction fermentable sugar.

Water inventory information—includes water flows, recycle liquid flows, evaporator condensate recycle flow, thin stillage or centrifuge liquor recycle flows, fresh water addition flows, processed water addition flows, slurry flows, mash flows, and various levels or weights for various tanks used to hold inventories of these flows or for intermediate receptacles (e.g. methanator feed tank, slurry feed tank, liquefaction tank, distillate tank, grain silo inventories or other biomass inventories (not water) etc.).

Liquefaction—for grains with high starch content, the starch is liquefied to reduce its carbohydrate chain length and viscosity by adding enzymes or other biologic agents.

Enzyme—highly selective biological-based catalyst added to manage specific reactions within a fermentation process. The most common enzymes used today include alpha amylase to rapidly break starches into dextrins, gluco-amylase to break dextrins into glucose, and proteases to break grain proteins into digestible proteins to support cell growth. In the same way as described below, modeling and controlling starch-based fermentations, enzymes specific for cellulosic conversion into biofuels or other enzymes affecting yeast (see below), growth or nutrient availability may be managed.

Yeast—a biofuel producing organism. Yeasts are currently the most commonly used organism in ethanol production although other biofuel producing organisms including genetically engineered *E. coli* can be substituted throughout as the technology described may not be specific to yeast, and may apply to many organisms used in fermentation processes to produce biofuel.

Stillage/Whole Stillage—non-fermentable solids and water liquid removed from the bottom of the primary distillation units.

Thin Stillage—the separated liquid from the stillage non-fermentable solids.

Syrup—concentrated thin-stillage with a large portion of the moisture removed. The % solids in syrup are usually in the range of 20-45% solids, but percentages outside this range may occur.

Capacity—capacity is the established maximum production rate of the process, sub-process, or unit under best operating conditions (no abnormal constraints). Capacity is generally a constant within the present capital investment. For new units it is the vendor's specified capacity. For established units, capacity is established by demonstrated historical production rates.

Model—an input/output representation, which represents the relationships between changes in various model inputs and how the model inputs affect each of the model outputs.

Dynamic Predictive Model—an input/output representation that not only reflects how much an output changes when an input is changed, but with what velocity and over what time-dependent curve an output will change based on one or more input variable changes.

Model Predictive Control (or MPC)—use of multivariate dynamic process models to relate controller objectives (targeted controller outputs and constraints) with regulatory controllers (existing single-input/single-output controllers such as ratio flow, temperature, level, speed, or pressure controllers) over a predicted time interval (e.g., 1 minute, 30 minutes, 2 hours, 100 hours, etc.).

Objective Function—sets the goals for the overall operation of the process or unit. The objective function provides one or several consistent numerical metric(s) to which the process or unit strives to achieve and over which the performance of the process or unit may be measured, e.g., minimize the cost of operation, or maximize profit or production of the operation.

Control Variables—(also called controlled variables) those variables that the controller/optimizer tries to bring to some objective, e.g., to a target value, maximum, etc.

Integrated Variables—integrated control variables are variables that are not stable, but integrate generally with a stable first derivative as a function of time. The most common integrated variable is a tank level where as long as inputs and outputs are imbalanced the level will increase or decrease. Thus, when balanced a change in an input or output flow will cause a tank to either overfill or drain as integrated over time. A controller must use these integration calculations to determine when and how rapidly input or output flows must be adjusted.

Manipulated Variables—those variables over which the management of the process or unit has authority and control, e.g., via regulation of the process with online controllers, and which are changed or manipulated by the controller/optimizer to achieve the targets or goals of the control variables. These variables are the actual control variables whose values are limited by the constraints. This is in distinction from controllable constraints in the sense that manipulated variables may operate within some range of controllable or fixed constraints. Manage is an alternate term for process control.

Disturbance Variable—a variable representing an external influence on a process that, in addition to objective variables and regulatory controllers, is outside the controller scope, and so it acts on the objective variables, but independently of the described controller. Disturbance variables are used in feed-forward disturbance rejection. Disturbance variables are also measured or unmeasured variables over which the management of the process or unit does not have direct authority or control. For example, temperature, humidity, upstream flow, or quality, may all be referred to as measured disturbance variables.

Set Point (targets)—the target signal or value for a manipulated variable or targeted controlled variable.

Constraints—Constraints represent limitations on particular operating variables or conditions that affect the achievable production rate of a production unit. Constraints are of two types: controllable and external, defined below. Constraints may include, but are not limited to: safety constraints, equipment constraints, equipment availability constraints, personnel constraints, business execution constraints, control constraints, supply chain constraints, environmental permit and legal constraints. Safety constraints ensure the safety of equipment and personnel. Equipment constraints, such as the maximum open position of a control valve, maximum tank capacity, etc., may limit the physical throughput of the unit. Equipment availability constraints may include, but are not limited to: readiness due to maintenance planning and scheduling, or due to unexpected equipment outages, authorized production level set by the supply chain and production scheduling systems. Personnel constraints refer to limitations on the availability of staffing and support functions, business rules and constraints imposed by contract and policy. Business execution constraints are limits imposed by the time required to execute associated business and contractual tasks and obligations. Control constraints are limits on the maximal position and rate of change of manipulated variables. Supply chain constraints are limits on the availability of raw materials, energy, and production supplies. Environmental permit and legal constraints are limits on air emissions, waste water, and waste disposal systems, and/or environmental constraints imposed upon the performance of the unit, such as river levels and current weather imposed limitations.

Controllable Constraints—constraints imposed on the performance of a process or unit over which the management of the process or unit does have authority and discretionary control. For example, the separation in a distillation tower may be affected by distillation tray fouling. The tray fouling is a function of how the feed-stock is processed, and how often the unit is taken offline for clean-up. It is management's discretion as to when the unit is serviced. Controllable constraints change a unit's throughput capacity.

External Constraints—external constraints are limitations imposed on the performance of the process, sub-process, or unit over which the management of the process, sub-process, or unit does not have authority or discretionary control. These external constraints come in two types: external constraints that are controllable by other entities or processes in the plant or in the supply chain, and those constraints that are imposed by physical, safety, environmental, or legal constraints and are not controllable by anyone in the plant or supply chain.

Objective Function—the objective function encodes an objective that sets the goal or goals for the overall operation of the process, sub-process, or unit. The objective function provides one or more consistent numerical metric(s) to which the process, sub-process, or unit strives to achieve and over which the performance of the process, sub-process, or unit may be measured, e.g., from a business standpoint.

System—a system may be defined by the inputs and the characteristics of the system or process. In the biofuel production process, the system may be defined for: the entire biofuel production process, a sub-process of the biofuel production process such as the milling and cooking process, or a variable in a sub-process such as the cooking temperature.

Open Loop Systems—are systems that respond to an input, but the system is not modified because of the behavior of the output. For example, in a biofuel system, a reciprocating pump will operate and move at a fixed volume of syrup independent of the upstream and downstream pressure if the reciprocating pump does not have a pressure control system.

Closed Loop Systems—system inputs may be adjusted to compensate for changes in the output. These changes may be a deviation from an objective for the system, impacts of constraints on the system or system variables, or measurements of output variables. The closed loop system may be used to sense the change and feedback the signal to the process input. In biofuel systems, closed loop systems may predominate, since these systems may be regulated subject to constraints such as production (product) quality, energy costs, process unit capacity, etc.

Control System—the regulatory level mechanism by which the manipulated variables are driven to the set points.

Response—the measurement of the current position of the manipulated variable. The response is the feedback of the movement of the manipulated variable to the set point in response to the actions of the control system in its effort to achieve the set point.

Target Profile—a desired profile or trajectory of variable values, i.e., a desired behavior of a control variable or a manipulated variable.

Control Horizon—the period of the time extending from the present into the future during which one plans to move or change manipulated variables. Beyond this horizon the MV is assumed to stay constant at its last or most recent value in the control horizon.

Prediction Horizon—the period of time extending from the present into the future during which the process or system response is monitored and compared to a desired behavior.

Determination of Total Mill Flow in a Biofuel Production Process

Below are described various embodiments of systems and methods for determining total mill flow in a biofuel production process. It should be noted that the biofuel or biofuels produced by embodiments of the methods described herein may be any of biofuel generated from biomass, and that the types of biomass contemplated may be of any type desired, including, but not limited to, grains, such as corn, wheat, rye, rice, etc., vegetables, e.g., potatoes, beats, etc., canes, such as sugarcane, and sorghum, and even grasses, e.g., switchgrass, and so forth, among others. Moreover, the techniques discloses herein may also be applicable to other bulk material processing, e.g., production of polymers, bulk foodstuffs, petroleum processing and production, and so forth.

Embodiments of the methods disclosed herein use material balance (of solids and/or water) to determine the flow of feedstock (solids) to the milling process. In some embodiments of the systems and methods described below, information regarding total mill flow may be received or derived via multiple approaches, and used together to generate mill flow information that is more accurate than that provided by any of the approaches alone.

A detailed description of this method is now described with reference to FIG. 2.

Figure 2:
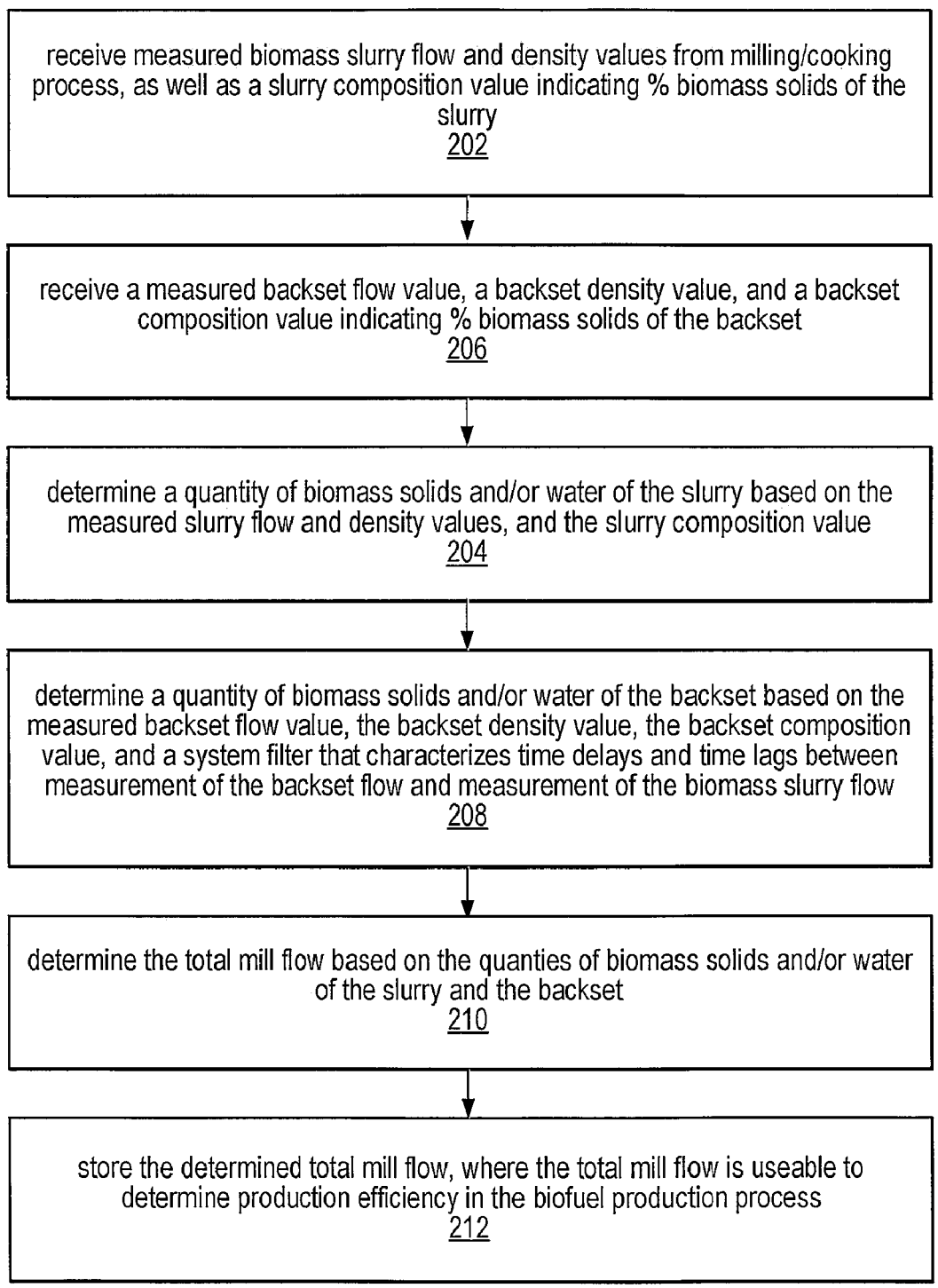
FIG. 2 is a high-level flowchart of a method for determining total mill flow in a biofuel production process, according to one embodiment.

FIG. 2—Method for Determining Total Mill Flow

FIG. 2 is a flowchart of a computer-implemented method for determining total mill flow in a biofuel production process, according to one embodiment. In various embodiments, some of the method elements shown may be performed concurrently, in a different order than shown, or may be omitted. Additional method elements may also be performed as desired. As shown, this method may operate as follows.

In 202, measured biomass slurry flow and slurry density values from a process fed by one or more mills, backset, and at least one water source, may be received. The process preferably includes one or more slurry mixing or holding tanks, and the slurry includes biomass solids and water. For example, the process may include or be included in the milling/cooking process of a biofuel plant. A slurry composition value indicating % biomass solids of the slurry may also be received. Note that the slurry composition value may indicate % biomass solids of the slurry directly, e.g., 30% solids, or indirectly, e.g., 70% water, since the solids and water values are complementary.

In 204, a measured backset flow value, a backset density value, and a backset composition value indicating % biomass solids of the backset, may be received. In preferred embodiments, the measured biomass slurry flow and slurry density values, and the measured backset flow value are received from sensors coupled to the biofuel process. For example, the biofuel production process, specifically, the milling/cooking process, may be instrumented with various sensors to measure these parameters or values. As with the slurry composition value, the backset composition value may indicate % biomass solids of the backset directly, e.g., 30% solids, or indirectly, e.g., 70% water, since the solids and water values are complementary.

Figure 3:
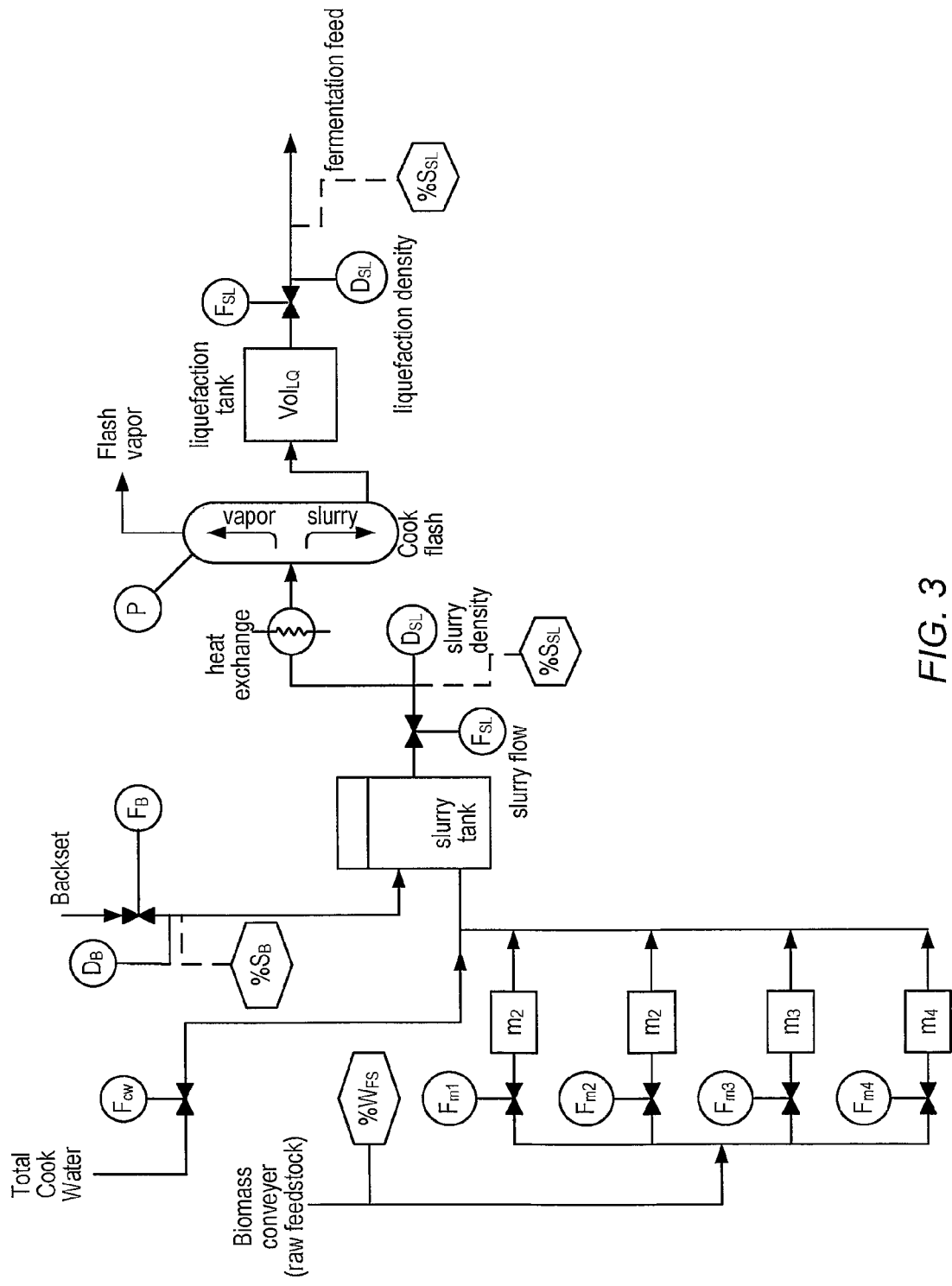
FIG. 3 illustrates instrumentation of the milling/cooking process in a biofuel production process, according to one embodiment.

FIG. 3 is a high-level diagram of an exemplary milling/cooking process in a biofuel production process or plant, according to one embodiment, where the process has been instrumented to provide the above measurements regarding slurry flow, slurry density, and backset flow. The biofuel production plant of FIG. 3 may include or be included in a system configured to implement embodiments of the present invention, as will be discussed in more detail below. For example, the system may include a plurality of sensors coupled to the biofuel process for providing the measured values discussed above, e.g., a slurry flow sensor configured to measure biomass slurry flow, a slurry density sensor configured to measure slurry density from the process, and a backset flow sensor configured to measure backset flow. Moreover, the system may also include one or more computers coupled to the process, and operable to perform embodiments of the methods disclosed herein.

Note that in FIG. 3, sensors are denoted by circles, labeled with an indication of the sensor type, e.g., "F" for flow sensors, "D" for density sensors, and subscripts indicating the source of the measurement, e.g., "$F_{SL}$" for slurry flow sensor, "$D_B$" for backset density sensor. Laboratory measurements, where samples are taken from the process and analyzed in a laboratory, are denoted by hexagons, labeled to indicate the parameter or metric measured or determined, e.g., "% $S_{SL}$" for percent solids of the slurry, "% $S_B$" for percent solids of the backset, and so forth.

As FIG. 3 shows, a biomass conveyor (e.g., one or more conveyor belts) provides raw biomass feedstock, such as corn, switchgrass, etc., to one or more mills, in this exemplary case, four mills, labeled accordingly. Each of these mills may provide a measure of mill flow for that mill, e.g., based on rotary pocket feeders, as indicated by mill flow sensors $F_{mi}$, where i indicates a particular mill; however, as mentioned above, these flow values are generally not accurate. Note that the percent water content of the feedstock biomass may be determined via laboratory analysis, as indicated by the %$W_{Fs}$ hexagon. The milled biomass may be mixed with cook water, which may be provided from various sources, including fresh water and recycled water from various processes in the plant, and which may be measured by a cook water flow sensor, denoted by the label $F_{CW}$, and fed to a slurry tank. Note that backset, which refers to a dilute slurry (e.g., typically about 8% solids) provided from one or more other processes in the plant, may also be provided to the slurry tank, thereby added additional moisture to the biomass slurry. As may be seen, the backset flow may be measured by a backset flow sensor $F_B$, and the backset density may be measured by a backset density sensor $D_B$. The backset composition value may be provided by laboratory analysis, as indicated by the % $S_B$ hexagon, or alternatively, via online measurement (from a sensor), or by any other means, as desired.

Similarly, slurry flow from the slurry tank may be measured by a slurry flow sensor $F_{SL}$, and slurry density may be measured by a slurry density sensor $D_{SL}$, as shown. Percent solids of the slurry may be determined via laboratory analysis, as indicated by the % $S_{SL}$ hexagon. Thus, slurry flow and density (and percent solids) may be determined for the slurry after exiting the slurry tank. In other embodiments, the slurry measurements may be made from elsewhere in the process, e.g., further downstream from the slurry tank. For example, as FIG. 3 shows, after exiting the slurry tank, the slurry may pass through a heat exchanger (which heats the slurry) into a cook flash unit, which may operate to extract moisture from the slurry as water vapor, referred to a flash vapor, and provide the resulting slurry to a liquefaction tank. Once the slurry leaves the liquefaction tank (e.g., for provision as a fermentation feed to batch fermenters), the slurry flow and density may be measured by sensors, as shown. Additionally, percent solids of the slurry may be determined via laboratory analysis, as indicated by the % $S_{SL}$ hexagon. Thus, in some embodiments, the slurry flow, density, and % solids, may be determined after liquefaction, instead of just after the slurry tank.

Note that in other embodiments, one or more of the measurements or parameter determinations may be made in a different manner than shown in FIG. 3 and described above. For example, in any cases where laboratory analysis provides a value (indicated by hexagons), or where density is measured or determined (or, in fact, any values), in various embodiments, the values may be determined by measurement, laboratory analysis (sampled from the process and analyzed in a laboratory), and/or by assumption, e.g., based on specified or empirical behavior of the process or equipment. In other words, the instrumentation of FIG. 3 is meant to be exemplary only, and is not intended to limit the invention to any particular instrumentation or data gathering scheme.

In 206, a quantity of biomass solids and/or water of the slurry may be determined based on the measured biomass slurry flow and slurry density values and the slurry composition value. For example, in one embodiment, the quantity of biomass solids, which may be referred to as slurry solids $S_{SL}$, may be determined via the expression:

$$S_{SL}=F_{SL} \times D_{SL} \times \% \, S_{SL}/100 \qquad (1)$$

Of course, the quantity of water of the slurry may be determined similarly using percent water of the slurry % $W_{SL}$, which is simply 100–% $S_{SL}$, as is well known to those of skill in the art.

In 208, a quantity of the biomass solids and/or water of the backset may be determined based on the measured backset flow value, the backset density value, the backset composition value, and a system filter that characterizes time delays and time lags of the between measurement of the backset flow and measurement of the biomass slurry flow. For example, the quantity of biomass solids, which may be referred to as backset solids $S_B$, may be determined via the expression:

$$S_B=F_B \times D_B \times \% \, S_B/100, \qquad (2)$$

where, as with the slurry, the quantity of water of the backset may be determined similarly using percent water of the slurry % $W_{SL}$.

In 210, total mill flow may then be determined based on the quantity of biomass solids and/or water of the slurry and the quantity of the biomass solids and/or water of the backset. In one embodiment, the total mill flow may be determined via the expression:

$$S_M=S_{SL}-S_B, \qquad (3)$$

based on the observation that all biomass solids in the slurry derive from two sources: the mill biomass from the mills, and the backset (typically around 8% solids). Thus, the total mill flow, denoted by $S_M$, meaning "mill solids", may be determined by subtracting the backset solids from the slurry solids. Of course, in other embodiments, equations (1) and (2) may be subsumed into equation (3), i.e., the intermediate computations of $S_{SL}$ and $S_B$ may not be performed as distinct calculations prior to determining the total mill flow.

Figure 4A:
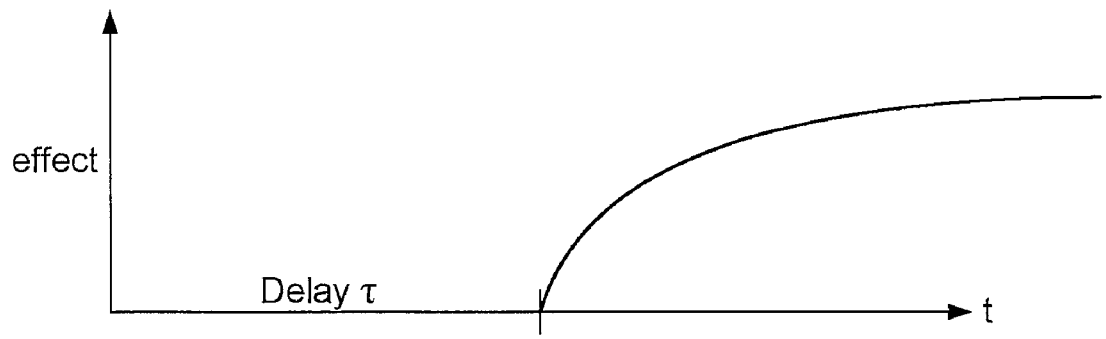
FIGS. 4A and 4B illustrate time delay and time lag for a process, according to one embodiment.
Figure 4B:
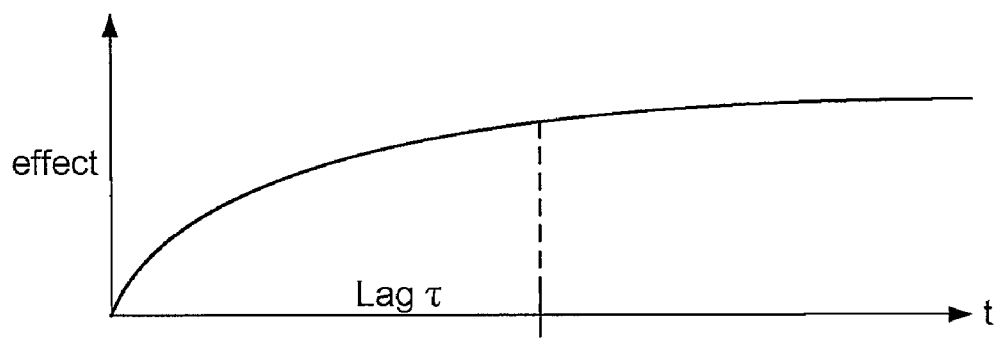

Note that since the milling/cooking process occurs over time, changes in input, e.g., from the backset, take some time to effect changes in the downstream slurry, which results in time delays and/or time lags, generally denoted by τ. FIGS. 4A and 4B illustrate process time delay and time lag, respectively. As FIG. 4A illustrates, in some cases there may be a time delay between an effect or event (origin of the plot), e.g., a control effect or event, such as changing a valve setting, toggling a switch, etc., and its intended target effect, because, for any of a variety of reasons it takes some finite time for the effects of the event to register downstream, i.e., to propagate to the target. For example, with respect to turning on a water source, the length of water piping leading from the source reservoir to the target may result in a predictable time delay before the target receives the water, e.g., a transport delay.

FIG. 4B illustrates time lag, where an effect (also at the origin of the plot) takes a finite amount of time to reach substantially full strength (e.g., 95% of the maximum effect) at the target. For example, in a slurry mixing tank, water input to the tank is mixed thoroughly with biomass before the slurry is drawn from the tank. Thus, a change in water flow to the tank at some specified time will result in changes in moisture of the resulting mixed slurry over some time period, referred to as the lag, and, assuming steady state, the slurry moisture content will approach some operationally close value, e.g., 95%, after the lag time has passed. For example, in the case of a mixing tank, τ is proportional to the residence time for the tank, e.g., the mean time it takes an element to travel from the input to the output, assuming perfect (or near perfect) mixing, e.g., τ=slurry tank volume/slurry flow into the tank.

Thus, a measurement made upstream at a particular time will not generally correspond to a measurement made downstream at the same time, and so in preferred embodiments, the system filter mentioned above may be used to adjust or account for the fact that the process occurs over time, and that changes in input, e.g., from the backset, take some time to effect changes in the downstream slurry. In other words, a filter may be needed to ensure that the input values, e.g., backset values are consonant with or appropriate with respect to, the downstream values, e.g., slurry values. The filter may be applied to input values, e.g., backset values, or others, to modify the values such that they correspond to measured values downstream, e.g., slurry values.

In some embodiments, the system filter may be a first order filter, although in other embodiments, any type of system filter may be used as desired. An example of a first order filter using τ is 1/(1+τ), as is well known in the art. This filter is generally applied to backset values of the process, e.g., $F_B$, $D_B$, % $S_B$, etc., to ameliorate the effects of time delays and time lags, as discussed above.

Note that the above expressions generally pertain to cases where slurry flow, density, and composition are determined just after the slurry exits the slurry tank. In cases where the slurry values are determined after liquefaction, additional terms may be required. For example, note that since the cook flash process removes water vapor from the slurry, this factor should be taken into account when determining flow amounts. For example, in the expression τ=tank volume/flow into the tank, the volume term must include the slurry tank volume, the liquefaction tank volume, and transport losses from transporting pipes, cook flash, or more generally, auxiliary terms capturing additional volume or material changes.

Similarly, as noted above, the material balances used to determine total mill flow may be based on water instead of solids, which may entail different parameters or terms, most notably, % W(ater), instead of % S(olids), among others. The mill solids may also be referred to as total mill flow $F_M$, which refers to the amount of biomass processed by the mills (and eventually converted to biofuel) over a specified time period, e.g., per day. Thus, expressed another way, Total mill flow $$F_M^* = \sum_{i=1}^{n} F_{M_i} \tag{4}$$
$$= S_M / (1 - \%W_M / 100)$$
$$= S_M + F_M \times \%W_M / 100,$$

where % $W_M$=100−% $S_M$, and where F* is F adjusted by the system filter. It should be noted that equations (1)-(4) assume steady state conditions.

In another embodiment, $F_M$ may be determined as follows:

$$W_{SL} = F_{SL} \times D_{SL} \times \% W_{SL}/100, \tag{5}$$

where $W_{SL}$ refers to water of the slurry. Now, it is also the case that:

$$W_{SL} = W_M + W_{Cook} + W_{SL}$$

or, in the case of the slurry after liquefaction, $$W_{SL} = W_M + W_{Cook} + W_{SL} - W_{FL}, \tag{6}$$

where $W_{Cook}$ refers to water in the total cook water, which may be determined from (total) cook water flow $F_{Cook}$×(total) cook water density $D_{Cook}$, and where $W_{FL}$ refers to flash loss, i.e., water vapor removed in the flash cook process. Note that as with the other terms, $W_{FL}$ may be determined via measurement, laboratory analysis, or may simply be assumed, e.g., based on empirical data, operator intuition, etc.

Similarly:

$$W_B = F_B \times D_B \times \% W_B/100, \tag{7}$$

where $W_B$ refers to water of the backset. Thus $$W_M = W_{SL} - W_{Cook} - W_B, \tag{8}$$

or, in the case of the slurry after liquefaction, $$W_M = W_{SL}^* - W_{Cook}^* - W_B^* + W_{FL} \tag{9}$$
$$= \sum_{i=1}^{n} F_{M_i} \times \%W_M$$

where $W^*_{SL}$, $W^*_{Cook}$, and $W^*_B$ (and possibly $W_{FL}$) are modified by an appropriate system filter.

Finally, the total mill flow may be determined thusly:

$$F_M = W_M / \% W_M / 100. \tag{10}$$

It should be noted that the above computations are meant to be exemplary only, and that other, functionally equivalent, mathematical forms may be used as desired, the point being that mass balance considerations are used to determine total mill flow.

Note that four primary embodiments of the invention are directed to 1) slurry just after exiting the slurry tank, using material balance of biomass solids, 2) slurry just after exiting the slurry tank, using material balance of biomass water, 3) slurry just after liquefaction, using material balance of biomass solids, 4) slurry just after liquefaction, using material balance of biomass water. Of course, other embodiments are also contemplated, the above being exemplary only, and not intended to limit the application of material balance in determining total mill flow in a biofuel production process to any particular measurements or computations.

In 212, the determined total mill flow may be stored, e.g., in a memory medium of a computer. The total mill flow may then be useable to determine production efficiency in the biofuel production process.

For example, in one embodiment, the determined total mill flow may be provided to a model predictive controller as input, and the model predictive controller may control milling rates based on the determined total mill flow. Additionally, or alternatively, the determined total mill flow may be indicated to an operator of the biofuel production process, and may be useable by the operator to control biofuel production in the biofuel production process. As is well known in the art of process control, this control may be performed in an iterative manner.

Thus, in some embodiments, the method may include controlling milling rates in the biofuel production process using the determined total mill flow, and performing the receiving measured biomass slurry flow and slurry density values, the receiving a slurry composition value, the receiving a measured backset flow value, the receiving a backset density value, the receiving a backset composition value, the determining a quantity of biomass solids and/or water of the slurry, the determining a quantity of the biomass solids and/or water of the backset, the determining total mill flow, the storing the determined total mill flow, and the controlling milling rates in the biofuel process, multiple times in an iterative manner to control biofuel production.

Thus, in some embodiments, a system implementing the above method may include one or more computers coupled to an instrumented biofuel production plant or process, where embodiments of the method may be implemented by program instructions executable by the one or more computers. Further details regarding automated process control systems are provided below with reference to FIGS. 5 and 6.

Further Embodiments

The following describes various further embodiments of the systems and methods discussed above, and presents exemplary techniques and uses illustrating variations of the present invention.

In one embodiment, the total mill flow described above may be used in conjunction with a value for total mill flow derived via different means. For example, a measured mill flow value determined or measured via the rotary pocket feeders used in the mills may be received. As another example, the measured mill flow value may be determined via weight measurements of raw biomass feedstock made prior to feeding the mills, e.g., from an accounting or logistics department or function that tracks feedstock provided to the plant, e.g., on a daily basis. The gross weight of biomass may be modified using a feedstock composition value indicating percent water value of the feedstock % $W_{FS}$, or conversely, percent solids of the feedstock, which may be determined via laboratory analysis (or simply assumed).

An adjusted total mill flow may then be determined as a weighted sum of the determined total mill flow and the measured mill flow value. In some embodiments, by combining these values in a weighted sum, a resulting value may be determined that is more accurate than either constituent value alone. One example of such a weighted sum is:

$$F_M' = aF_{MD} + bF_{MM}, \quad (11)$$

where $F_M'$ is the adjusted total mill flow, where $F_{MD}$ is the determined total mill flow (via the method of FIG. 2), $F_{MM}$ is a measured value of total mill flow, and where a and b are weighting coefficients that sum to 1, e.g., 0.5 and 0.5, 0.2 and 0.8, etc. By selecting appropriate values for these coefficients, e.g., by tuning these coefficients to a particular plant, a more accurate value for total mill flow may be determined.

Figure 5:
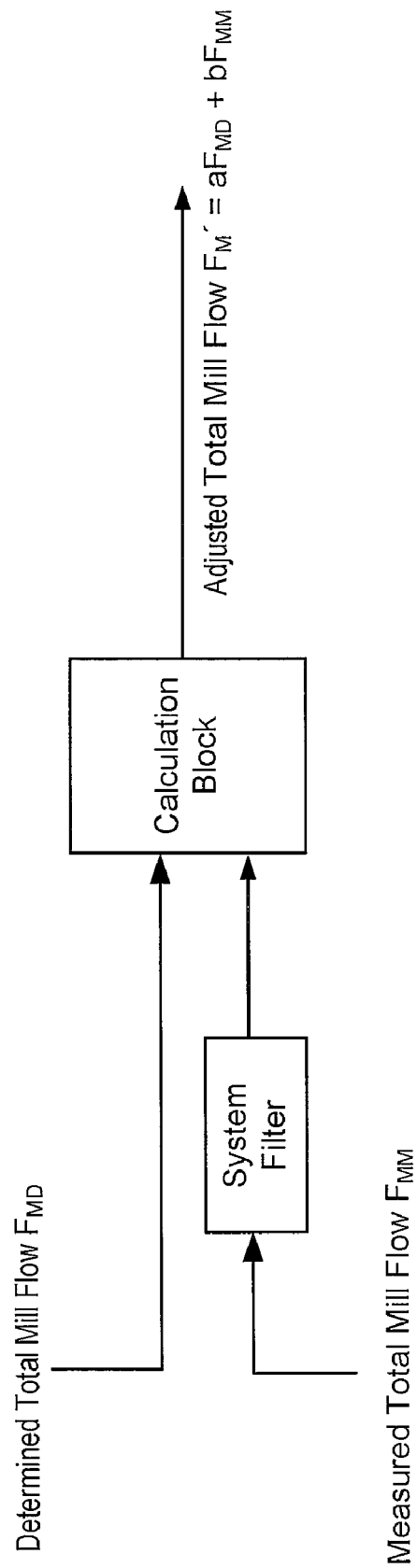
FIG. 5 illustrates a calculation block for determining adjusted total mill flow, according to one embodiment.

Thus, the adjusted total mill flow $F_M'$ may be determined by an additive bias, whereby the determined and measured values are weighted and summed. For example, in preferred embodiments, the biofuel production plant or process may include or be coupled to computing means, e.g., one or more computers or controllers with memory that stores program instructions executable by the processor to implement embodiments of the method described herein. More specifically, in one embodiment, the program instructions may implement a calculation or function block configured to receive the determined and measured values, and possibly the system filter (or parameters for the system filter), and determine the weighted sum, i.e., the adjusted total mill flow. Such an exemplary calculation block is shown in FIG. 5, where the determined total mill flow and the measured total mill flow are input to the calculation block, and where the measured total mill flow is first processed by a system filter to make it commensurate with the determined total mill flow, and the adjusted total mill flow output. Note that in some embodiments, the system filter may simply be stored in the calculation block, and thus may not need to be input.

In some embodiments, the method may include determining these weighting coefficients for the normalized weighted sum of the determined total mill flow and the measured mill flow value. For example, in one embodiment, the coefficients may be determined as follows: historical values for biomass feedstock inventory changes over a specified time period, and historical values for determined total mill flow and the measured mill flow may be received, and may be integrated over the specified time period to generated integrated total mill flow and integrated measured mill flow. Regression analysis may then be performed on a weighted sum of the integrated total mill flow and integrated measured mill flow that minimizes error between the weighted sum and the historical values to determine the weighting coefficients historical values to determine the weighting coefficients.

It should be noted that the above describes but one exemplary technique for determining the weighting coefficients, and that any other techniques may be used as desired, including statistical or random search techniques such as simulated annealing, Levy flights, and so forth, among others.

Note, however, that in other embodiments, the biasing may be accomplished via multiplicative biasing, where instead of applying coefficients for a weighted sum, as described above, where a fraction of the difference between the measured and determined terms is used to adjust measured flow, a multiplicative ratio of the measured and determined terms, e.g., $F_{MD}/F_{MM}$, may be used to adjust the measured value to calculate the adjusted total mill flow, e.g., $$F_M' = F_{MM} \times (F_{MD}/F_{MM}) \times a, \quad (12)$$

where a is a weight coefficient that may be used to limit the effect of the ratio, e.g., a=range {0 . . . 1}.

Thus, the adjusted total mill flow may be determined using any of a variety of biasing techniques, the above techniques being exemplary only.

Note that when an adjusted total mill flow is determined, this value may be used in the same manner as the (unadjusted) total mill flow described above. In other words, the adjusted total mill flow may be provided to a model predictive controller as input, and the model predictive controller may control milling rates based on the adjusted total mill flow. Additionally, or alternatively, the adjusted total mill flow may be indicated to an operator of the biofuel production process, and may be useable by the operator to control biofuel production in the biofuel production process. As is well known in the art of process control, this control may be performed in an iterative manner.

Thus, in some embodiments, the method may include controlling milling rates in the biofuel production process using the adjusted total mill flow, and performing the receiving measured biomass slurry flow and slurry density values, the receiving a slurry composition value, the receiving a measured backset flow value, the receiving a backset density value, the receiving a backset composition value, the determining a quantity of biomass solids and/or water of the slurry, the determining a quantity of the biomass solids and/or water of the backset, the determining total mill flow, the storing the adjusted total mill flow, and the controlling milling rates in the biofuel process, multiple times in an iterative manner to control biofuel production.

Figure 6:
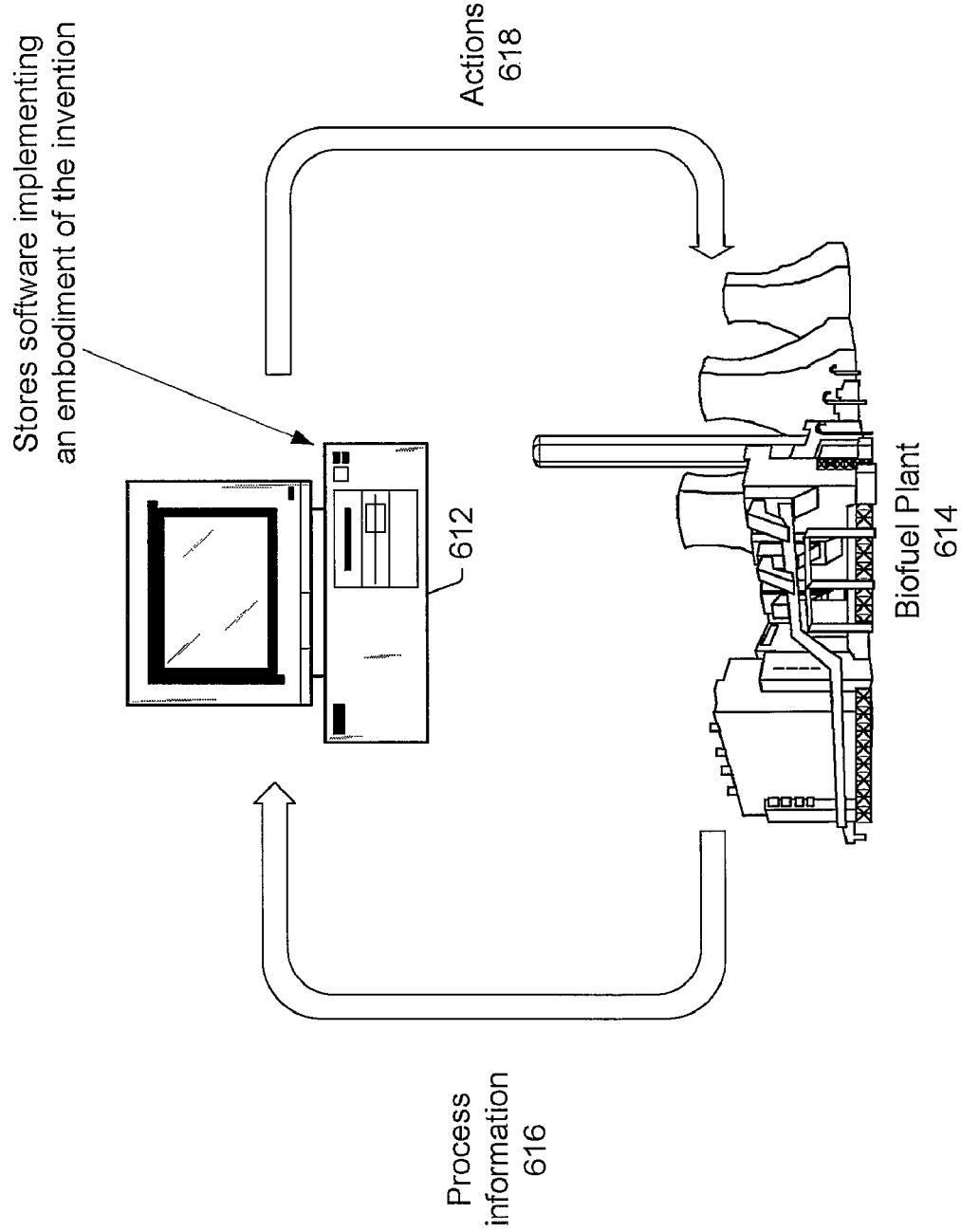
FIG. 6 illustrates model predictive control of a biofuel production process, according to one embodiment.

FIG. 6—Model Predictive Control of a Biofuel Production Process

As noted above, in preferred embodiments, the system may include one or more computing means, e.g., computers, configured to store and execute program instructions implementing embodiments of the present invention. For example, in addition to performing embodiments of the method of FIG. 2, the program instructions may be executable to implement a model predictive controller executable to receive the determined total mill flow (which may include the adjusted total mill flow) as input, and control milling rates based on the determined total mill flow, as discussed above.

FIG. 6 illustrates a simplified view of an automated control system for a biofuel production plant 614. As shown, the system may include one or more computer systems 612 which interact with the biofuel plant 614 being controlled. The computer system 612 may represent any of various types of computer systems or networks of computer systems which execute software program(s) according to various embodiments of the present invention. As indicated, the computer system stores (and executes) software implementing embodiments of the present invention, including software for determining total mill flow (which may include adjusted total mill flow) in the biofuel plant 614, as described above. The software program(s) may perform the above described determination of total mill flow, and may also perform control or management functions for the biofuel plant 614, e.g., possibly including various aspects of modeling, prediction, optimization and/or control of the milling process. Thus, the control system may implement predictive model control of milling and/or other processes or sub-processes in the biofuel plant or process. The system may further provide an environment for making optimal decisions using an optimization solver, i.e., an optimizer, and carrying out those decisions, e.g., to control the plant.

Thus, the system may provide an environment for a scheduling process of programmatically retrieving process information 616 relevant to the processes of the plant, and determining total (which may include adjusted) mill flow as described above, and generating actions 618, e.g., control actions, to control the biofuel production process, e.g., including controlling milling rates of the biofuel plant or process.

The one or more computer systems 612 preferably include a memory medium on which computer programs according to the present invention are stored. In other words, embodiments of the methods described herein may be implemented by software, where the software is stored on a memory medium in or coupled to the system. The term "memory medium" is intended to include various types of memory or storage, including an installation medium, e.g., a CD-ROM, or floppy disks, one or more computer system memories or random access memory such as DRAM, SRAM, EDO RAM, Rambus RAM, etc., or a non-volatile memory such as a magnetic medium, e.g., a hard drive, or optical storage. The memory medium may include other types of memory as well, or combinations thereof. In addition, the memory medium may be located in a first computer in which the programs are executed, or may be located in a second different computer which connects to the first computer over a network. In the latter instance, the second computer provides the program instructions to the first computer for execution. The memory medium may include a plurality of memory media, possibly distributed across multiple computer systems.

Also, as noted above the computer system(s) 612 may take various forms, including a personal computer system, mainframe computer system, workstation, embedded controller, network appliance, Internet appliance or other device. In general, the term "computer system" can be broadly defined to encompass any device (or collection of devices) having a processor (or processors) which executes instructions from a memory medium.

The memory medium (which may include a plurality of memory media) preferably stores one or more software programs for performing embodiments of the method described above, and may also implement various aspects of model predictive control and optimization. The software program(s) are preferably implemented using component-based techniques and/or object-oriented techniques. For example, the software program may be implemented using ActiveX controls, C++ objects, Java objects, Microsoft Foundation Classes (MFC), or other technologies or methodologies, as desired. The software programs may also include one or more nonlinear models, e.g., artificial neural networks, support vector machines, etc., as desired. A CPU, such as the host CPU, executing code and data from the memory medium includes a means for creating and executing the software program according to the methods or flowcharts described below. In some embodiments, the one or more computer systems may implement one or more controllers, as noted above.

It should be noted that as used herein, the terms "maximum", "minimum", and "optimum", may refer respectively to "substantially maximum", "substantially minimum", and "substantially optimum", where "substantially" indicates a value that is within some acceptable tolerance of the theoretical extremum, optimum, or target value. For example, in one embodiment, "substantially" may indicate a value within 10% of the theoretical value. In another embodiment, "substantially" may indicate a value within 5% of the theoretical value. In a further embodiment, "substantially" may indicate a value within 2% of the theoretical value. In yet another embodiment, "substantially" may indicate a value within 1% of the theoretical value. In other words, in all actual cases (non-theoretical), there are physical limitations of the final and intermediate control element, dynamic limitations to the acceptable time frequency for stable control, or fundamental limitations based on currently understood chemical and physical relationships. Within these limitations the control system will generally attempt to achieve optimum operation, i.e., operate at a targeted value or constraint (max or min) as closely as possible.

Virtual Analyzers for the Biofuel Production Process

In some embodiments, the methods described above may be implemented via a virtual online analyzer (VOA). A typical VOA is a computer-implemented process whereby values or parameters of a process that are not readily available via direct measurement may be estimated or calculated for use in lieu of the measured data. In some embodiments of the present invention, the determination of the total mill flow (and/or adjusted total mill flow) as described above may be performed by a VOA.

Thus, embodiments of the systems and methods described above may operate to determine total mill flow (which may include adjusted total mill flow) of a biofuel production process, which may then be used to operate the biofuel process in a substantially optimal fashion.

Although the system and method of the present invention has been described in connection with the preferred embodiment, it is not intended to be limited to the specific form set forth herein, but on the contrary, it is intended to cover such alternatives, modifications, and equivalents, as can be reasonably included within the spirit and scope of the invention as defined by the appended claims.

We claim:

1. A computer-implemented method for determining total mill flow in a biofuel production process, the method comprising:
using one or more physical computing devices programmed to perform the steps of:
receiving measured biomass slurry flow and slurry density values from a process fed by one or more mills, backset, and at least one water source, wherein the process comprises one or more slurry mixing or holding tanks, and wherein the slurry comprises biomass solids and water;
receiving a slurry composition value indicating percentage biomass solids of the slurry;
receiving a measured backset flow value;
receiving a backset density value;
receiving a backset composition value indicating percentage biomass solids of the backset;
determining a quantity of biomass solids and/or water of the slurry based on the measured biomass slurry flow and slurry density values and the slurry composition value;
determining a quantity of the biomass solids and/or water of the backset based on the measured backset flow value, the backset density value, and the backset composition value, and based on input from a computer-implemented filter that accounts for time delays and time lags between measurement of the backset flow and measurement of the biomass slurry flow;
determining total mill flow based on the quantity of biomass solids and/or water of the slurry and/or water of the backset; and
storing the determined total mill flow, wherein the total mill flow is useable to determine production efficiency in the biofuel production process.

2. The method of claim 1, further comprising:
providing the determined total mill flow to a model predictive controller as input; and
the model predictive controller controlling milling rates based on the determined total mill flow.

3. The method of claim 1, further comprising:
indicating the determined total mill flow to an operator of the biofuel production process;
wherein the determined total mill flow is useable by the operator to control biofuel production in the biofuel production process.

4. The method of claim 1, further comprising:
controlling milling rates in the biofuel production process using the determined total mill flow; and
performing said receiving measured biomass slurry flow and slurry density values, said receiving a slurry composition value, said receiving a measured backset flow value, said receiving a backset density value, said receiving a backset composition value, said determining a quantity of biomass solids and/or water of the slurry, said determining a quantity of the biomass solids and/or water of the backset, said determining total mill flow, said storing the determined total mill flow, and said controlling milling rates in the biofuel process, multiple times in an iterative manner to control biofuel production.

5. The method of claim 1, further comprising:
receiving a measured mill flow value;
determining an adjusted total mill flow as a weighted sum of the determined total mill flow and the measured mill flow value.

6. The method of claim 5, further comprising:
determining weighting coefficients for the weighted sum of the determined total mill flow and the measured mill flow value, comprising:
receiving historical values for biomass feedstock inventory changes over a specified time period;
receiving historical values for determined total mill flow and the measured mill flow;
integrating the historical values for the determined total mill flow and the measured mill flow over the specified time period to generated integrated total mill flow and integrated measured mill flow; and
performing regression analysis on a weighted sum of the integrated total mill flow and integrated measured mill flow that minimizes error between the weighted sum and the historical values to determine the weighting coefficients.

7. The method of claim 5, further comprising:
providing the adjusted total mill flow to a model predictive controller as input; and
the model predictive controller controlling milling rates based on the adjusted total mill flow.

8. The method of claim 5, further comprising:
indicating the adjusted total mill flow to an operator of the biofuel production process;
wherein the adjusted total mill flow is useable by the operator to control biofuel production in the biofuel production process.

9. The method of claim 5, further comprising:
controlling milling rates in the biofuel production process using the adjusted total mill flow; and
performing said receiving measured biomass slurry flow and slurry density values, said receiving a slurry composition value, said receiving a measured backset flow value, said receiving a backset density value, said receiving a backset composition value, said determining a quantity of biomass solids and/or water of the slurry, said determining a quantity of the biomass solids and/or water of the backset, said determining total mill flow, said storing the determined total mill flow, receiving a measured mill flow value, said determining an adjusted total mill flow, and said controlling milling rates in the biofuel process, multiple times in an iterative manner to control biofuel production.

10. A system for determining total mill flow in a biofuel production process, comprising:

a plurality of sensors coupled to the biofuel process, comprising:

a slurry flow sensor configured to measure biomass slurry flow from a process fed by one or more mills, backset, and at least one water source, wherein the process comprises one or more slurry mixing or holding tanks, and wherein the slurry comprises biomass solids and water;

a slurry density sensor configured to measure slurry density from the process; and a backset flow sensor configured to measure backset flow;

at least one processor and memory, coupled to the plurality of sensors, wherein the memory stores program instructions executable by the at least one processor to:

receive a measured biomass slurry flow value from the slurry flow sensor;

receive a measured slurry density value from the slurry density sensor;

receive a slurry composition value indicating percentage biomass solids of the slurry;

receive a measured backset flow value from the backset flow sensor;

receive a backset density value;

receive a backset composition value indicating percentage biomass solids of the backset;

determine a quantity of biomass solids and/or water of the slurry based on the measured biomass slurry flow and slurry density values and the slurry composition value;

determine a quantity of the biomass solids and/or water of the backset based on the measured backset flow value, the backset density value, and the backset composition value, and based on input from a computer-implemented filter that accounts for time delays and time lags between measurement of the backset flow and measurement of the biomass slurry flow;

determine total mill flow based on the quantity of biomass solids and/or water of the slurry and/or water of the backset; and store the determined total mill flow, wherein the total mill flow is useable to determine production efficiency in the biofuel production process.

11. The system of claim 10, wherein the program instructions are further executable to implement a model predictive controller, wherein the model predictive controller is executable to:

receive the determined total mill flow as input; and control milling rates based on the determined total mill flow.

12. The system of claim 10, wherein the program instructions are further executable to:

indicate the determined total mill flow to an operator of the biofuel production process;

wherein the determined total mill flow is useable by the operator to control biofuel production in the biofuel production process.

13. The system of claim 10, wherein the program instructions are further executable to:

control milling rates in the biofuel production process using the determined total mill flow; and perform said receiving measured biomass slurry flow and slurry density values, said receiving a slurry composition value, said receiving a measured backset flow value, said receiving a backset density value, said receiving a backset composition value, said determining a quantity of biomass solids and/or water of the slurry, said determining a quantity of the biomass solids and/or water of the backset, said determining total mill flow, said storing the determined total mill flow, and said controlling milling rates in the biofuel process, multiple times in an iterative manner to control biofuel production.

14. The system of claim 10, wherein the program instructions are further executable to:

receive a measured mill flow value, wherein, to determine total mill flow, the program instructions are executable to:

determine an adjusted total mill flow as a weighted sum of the determined total mill flow and the measured mill flow value.

15. The system of claim 14, wherein the program instructions are further executable to implement a model predictive controller, wherein the model predictive controller is executable to:

receive the adjusted total mill flow as input; and control milling rates based on the adjusted total mill flow.

16. The system of claim 14, wherein the program instructions are further executable to:

indicate the adjusted total mill flow to an operator of the biofuel production process;

wherein the adjusted total mill flow is useable by the operator to control biofuel production in the biofuel production process.

17. The system of claim 14, wherein the program instructions are further executable to:

control milling rates in the biofuel production process using the adjusted total mill flow; and perform said receiving measured biomass slurry flow and slurry density values, said receiving a slurry composition value, said receiving a measured backset flow value, said receiving a backset density value, said receiving a backset composition value, said determining a quantity of biomass solids and/or water of the slurry, said determining a quantity of the biomass solids and/or water of the backset, said determining total mill flow, said storing the determined total mill flow, receiving a measured mill flow value, said determining an adjusted total mill flow, and said controlling milling rates in the biofuel process, multiple times in an iterative manner to control biofuel production.

18. A non-transitory computer-accessible memory medium that stores program instructions for determining total mill flow in a biofuel production process, wherein the program instructions are executable by a processor to perform:

receiving measured biomass slurry flow and slurry density values from a process fed by one or more mills, backset, and at least one water source, wherein the process comprises one or more slurry mixing or holding tanks, and wherein the slurry comprises biomass solids and water;

receiving a slurry composition value indicating percentage biomass solids of the slurry;

determining a quantity of biomass solids and/or water of the slurry based on the measured biomass slurry flow and slurry density values and the slurry composition value;

receiving a measured backset flow value;

receiving a backset density value;

receiving a backset composition value indicating percentage biomass solids of the backset;

determining a quantity of the biomass solids and/or water of the backset based on the measured backset flow value, the backset density value, and the backset composition value, and based on input from a computer-implemented filter that accounts for time delays and time lags between measurement of the backset flow and measurement of the biomass slurry flow;

determining total mill flow based on the quantity of biomass solids and/or water of the slurry and/or water of the backset; and storing the determined total mill flow, wherein the total mill flow is useable to determining production efficiency in the biofuel production process.

19. The memory medium of claim 18, wherein the program instructions are further executable to implement a model predictive controller, wherein the model predictive controller is executable to perform:

receiving the determined total mill flow as input; and controlling milling rates based on the determined total mill flow.

20. The memory medium of claim 18, wherein the program instructions are further executable to perform:

indicating the determined total mill flow to an operator of the biofuel production process;

wherein the determined total mill flow is useable by the operator to control biofuel production in the biofuel production process.

21. The memory medium of claim 18, wherein the program instructions are further executable to perform:

controlling milling rates in the biofuel production process using the determined total mill flow; and performing said receiving measured biomass slurry flow and slurry density values, said receiving a slurry composition value, said receiving a measured backset flow value, said receiving a backset density value, said receiving a backset composition value, said determining a quantity of biomass solids and/or water of the slurry, said determining a quantity of the biomass solids and/or water of the backset, said determining total mill flow, said storing the determined total mill flow, and said controlling milling rates in the biofuel process, multiple times in an iterative manner to control biofuel production.

22. The memory medium of claim 18, wherein the program instructions are further executable to perform:

receiving a measured mill flow value, wherein said determining total mill flow comprises:

determining an adjusted total mill flow as a weighted sum of the determined total mill flow and the measured mill flow value.

23. The memory medium of claim 22, wherein the program instructions are further executable to implement a model predictive controller, wherein the model predictive controller is executable to perform:

receiving the adjusted total mill flow as input; and controlling milling rates based on the adjusted total mill flow.

24. The memory medium of claim 22, wherein the program instructions are further executable to perform:

indicating the adjusted total mill flow to an operator of the biofuel production process;

wherein the adjusted total mill flow is useable by the operator to control biofuel production in the biofuel production process.

25. The memory medium of claim 22, wherein the program instructions are further executable to perform:

controlling milling rates in the biofuel production process using the adjusted total mill flow; and performing said receiving measured biomass slurry flow and slurry density values, said receiving a slurry composition value, said receiving a measured backset flow value, said receiving a backset density value, said receiving a backset composition value, said determining a quantity of biomass solids and/or water of the slurry, said determining a quantity of the biomass solids and/or water of the backset, said determining total mill flow, said storing the determined total mill flow, receiving a measured mill flow value, said determining an adjusted total mill flow, and said controlling milling rates in the biofuel process, multiple times in an iterative manner to control biofuel production.

* * * * *